US010417562B2

(12) United States Patent
Ioffe et al.

(10) Patent No.: US 10,417,562 B2
(45) Date of Patent: Sep. 17, 2019

(54) BATCH NORMALIZATION LAYERS

(71) Applicant: Google LLC, Mountain View, CA (US)

(72) Inventors: Sergey Ioffe, Mountain View, CA (US); Corinna Cortes, New York, NY (US)

(73) Assignee: Google LLC, Mountain View, CA (US)

( * ) Notice: Subject to any disclaimer, the term of this patent is extended or adjusted under 35 U.S.C. 154(b) by 704 days.

(21) Appl. No.: 15/009,647

(22) Filed: Jan. 28, 2016

(65) Prior Publication Data

US 2016/0217368 A1 Jul. 28, 2016

Related U.S. Application Data

(60) Provisional application No. 62/108,984, filed on Jan. 28, 2015.

(51) Int. Cl.
*G06N 3/08* (2006.01)
*G06N 3/04* (2006.01)

(52) U.S. Cl.
CPC .................. *G06N 3/08* (2013.01); *G06N 3/04* (2013.01)

(58) Field of Classification Search
CPC .............................. G06N 99/005; G06N 3/08
See application file for complete search history.

(56) References Cited

U.S. PATENT DOCUMENTS 5,479,576 A * 12/1995 Watanabe ................ G06N 3/08
706/25
5,541,590 A * 7/1996 Nishio .................... B60K 28/14
340/435
5,729,662 A * 3/1998 Rozmus ................. G06K 9/6251
706/20

(Continued)

FOREIGN PATENT DOCUMENTS

CN          1945602     4/2007
EP          2345984     7/2011

(Continued)

OTHER PUBLICATIONS

Lin et al. "Network in Network" National University of Singapore [Published online Mar. 4, 2014] [Retrieved online Oct. 22, 2018] <URL: https://arxiv.org/pdf/1312.4400.pdf> (Year: 2014).*

(Continued)

*Primary Examiner* — Scott A. Waldron
*Assistant Examiner* — Fen Christopher Tamulonis
(74) *Attorney, Agent, or Firm* — Fish & Richardson P.C.

(57) ABSTRACT

Methods, systems, and apparatus, including computer programs encoded on computer storage media, for processing inputs using a neural network system that includes a batch normalization layer. One of the methods includes receiving a respective first layer output for each training example in the batch; computing a plurality of normalization statistics for the batch from the first layer outputs; normalizing each component of each first layer output using the normalization statistics to generate a respective normalized layer output for each training example in the batch; generating a respective batch normalization layer output for each of the training examples from the normalized layer outputs; and providing the batch normalization layer output as an input to the second neural network layer.

34 Claims, 3 Drawing Sheets

(56) References Cited

U.S. PATENT DOCUMENTS

| | | | |
|---|---|---|---|
| 5,790,758 A * | 8/1998 | Streit | G06K 9/6277 |
| | | | 706/20 |
| 5,875,284 A | 2/1999 | Watanabe et al. | |
| 6,134,537 A * | 10/2000 | Pao | G06K 9/6232 |
| | | | 706/16 |
| 6,539,267 B1 * | 3/2003 | Eryurek | G05B 13/0275 |
| | | | 700/129 |
| 6,650,779 B2 * | 11/2003 | Vachtesvanos | G01N 21/956 |
| | | | 348/88 |
| 2003/0236662 A1 | 12/2003 | Goodman | |
| 2004/0193559 A1 | 9/2004 | Hoya | |
| 2005/0125369 A1 | 6/2005 | Buck et al. | |
| 2005/0283450 A1 | 12/2005 | Matsugu | |
| 2008/0071710 A1 | 3/2008 | Serre | |
| 2014/0365195 A1 | 12/2014 | Lahiri | |

FOREIGN PATENT DOCUMENTS

| | | |
|---|---|---|
| EP | 3251059 | 12/2018 |
| JP | 2013-69132 | 2/2014 |
| RU | 2424561 | 9/2009 |
| WO | WO 2007/027452 | 3/2007 |
| WO | WO2016123409 | 8/2016 |

OTHER PUBLICATIONS

LeCun et al. "Efficient BackProp" yann.lecun.com [Published Online 2012] [Retrieved online Oct. 22, 2018] <URL:http://yann.lecun.com/exdb/publis/pdf/lecun-98b.pdf> (Year: 2012).*

Krizhevsky et al. "ImageNet Classification with Deep Convolutional Neural Networks" NIPS '12 Proceedings vol. 1 p. 1097-1105 [Published Online 2012] [retrieved online Oct. 22, 2018] <URL:https://papers.nips.cc/paper/4824-imagenet-classification-with-deep-convolutional-neural-networks.pdf> (Year: 2012).*

Kavukcuoglu et al. "Learning Convolutional Feature Hierarchies for Visual Recognition" NIPS '10 Proceedings vol. 1 pp. 1090-1098 [Published Online 2010] [Retrieved online Oct. 22, 2018] <URL:https://papers.nips.cc/paper/4133-learning-convolutional-feature-hierarchies-for-visual-recognition.pdf> (Year: 2010).*

Engelbrecht et al. "Automatic Scaling using gamma learning for Feedforward Neural Networks" IWANN 1995 pp. 374-381 [Published online 2005] [Retrieved Online Oct. 22, 2018] <URL: https://link.springer.com/content/pdf/10.1007/3-540-59497-3198.pdf> (Year: 1995).*

Szegedy et al. "Intriguing properties of neural networks" Cornell University Library [Published Online 2014] [Retrieved online Oct. 22, 2018] <URL: https://arxiv.org/pdf/1312.6199.pdf> (Year: 2014).*

Sainath et al. "Learning Filter Banks within a Deep Neural Network Framework" 2013 IEEE workshop on Automatic Speech Recognition and Understanding [Published Online 2014] [Retrieved Online Oct. 22, 2018] <URL:https://ieeexplore.ieee.org/document/6707746> (Year: 2013).*

International Preliminary Report on Patentability issued in International Application No. PCT/US2016/015476, dated Aug. 1, 2017, 8 pages.

Office Action issued in Australian Application No. 2016211333, dated Feb. 19, 2018, 2 pages.

Gülçehre et al., "Knowledge Matters: Importance of Prior Information for Optimization," arXiv:1301.4083v6 [cs.LG], Jul. 13, 2013, pp. 1-37, XP055266282.

International Search Report and Written Opinion in International Application No. PCT/US2016/015476, dated May 4, 2016, 13 pages.

Ioffe et al., "Batch Normalization: Accelerating Deep Network Training by Reducing Internal Covariate Shift," arXiv:1502.03167v3 [cs.LG], Mar. 2, 2015, pp. 1-11, XP055266268.

Jiang, "A literature survey on domain adaptation of statistical classifiers," Mar. 2008 [retrieved on Jun. 6, 2016]. Retrieved from the Internet: URL<http://sifaka.cs.uiuc.edu/jiang4/domainadaptation/survey>, pp. 1-12.

LeCun et al., "Efficient BackProp," Jan. 1, 1901, Correct System Design; [Lecture Notes in Computer Science; Lect.Notes Computer], Springer International Publishing, Cham, pp. 9-48, XP047292571.

Lyu and Simoncelli, "Nonlinear image representation using divisive normalization," In Proc. Computer Vision and Pattern Recognition, IEEE Computer Society, pp. 1-8, Jun. 2008.

Povey et al., "Parallel training of deep neural networks with natural gradient and parameter averaging," CoRR, abs/1410.7455, pp. 1-28, Oct. 2014.

Raiko et al., "Deep learning made easier by linear transformations in perceptrons," In International Conference on Artificial Intelligence and Statistics (AISTATS), pp. 924-932, 2012.

Wiesler et al., "A convergence analysis of log-linear training," In Advances in Neural Information Processing Systems 24, pp. 657-665, Dec. 2011.

Wiesler et al., "Mean-normalized stochastic gradient for large-scale deep learning," In IEEE International Conference on Acoustics, Speech, and Signal Processing, pp. 180-184, May 2014.

Office Action issued in Canadian Application No. 2975251, dated Jun. 8, 2018, 5 pages.

Office Action issued in Singaporean Application No. 11201706127R, dated Mar. 27, 2018, 7 pages.

EP Extended European Search Report issued in European Application No. 18207898.0, dated Apr. 3, 2019, 8 pages.

RU Office Action issued in Russian Application No. 2017130151, dated Jun. 27, 2018, 25 pages (with English translation).

CA Office Action in Canadian Appln No. 2,975,251, dated May 30, 2019, 5 pages.

* cited by examiner

BATCH NORMALIZATION LAYERS

CROSS-REFERENCE TO RELATED APPLICATION

This application claims priority to U.S. Provisional Application No. 62/108,984, filed on Jan. 28, 2015. The disclosure of the prior application is considered part of and is incorporated by reference in the disclosure of this application.

BACKGROUND

This specification relates to processing inputs through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a neural network system implemented by one or more computers that includes a batch normalization layer between a first neural network layer and a second neural network layer, wherein the first neural network layer generates first layer outputs having a plurality of components, where the batch normalization layer is configured to, during training of the neural network system on a batch of training examples: receive a respective first layer output for each training example in the batch; compute a plurality of normalization statistics for the batch from the first layer outputs; normalize each component of each first layer output using the normalization statistics to generate a respective normalized layer output for each training example in the batch; generate a respective batch normalization layer output for each of the training examples from the normalized layer outputs; and provide the batch normalization layer output as an input to the second neural network layer.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. A neural network system that includes one or more batch normalization layers can be trained more quickly than an otherwise identical neural network that does not include any batch normalization layers. For example, by including one or more batch normalization layers in the neural network system, problems caused by the distribution of a given layer's inputs changing during training can be mitigated. This may allow higher learning rates to be effectively used during training and may reduce the impact of how parameters are initialized on the training process. Additionally, during training, the batch normalization layers can act as a regularizer and may reduce the need for other regularization techniques, e.g., dropout, to be employed during training. Once trained, the neural network system that includes one normalization layers can generate neural network outputs that are as accurate, if not more accurate, than the neural network outputs generated by the otherwise identical neural network system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that includes a batch normalization layer.

Figure 1:
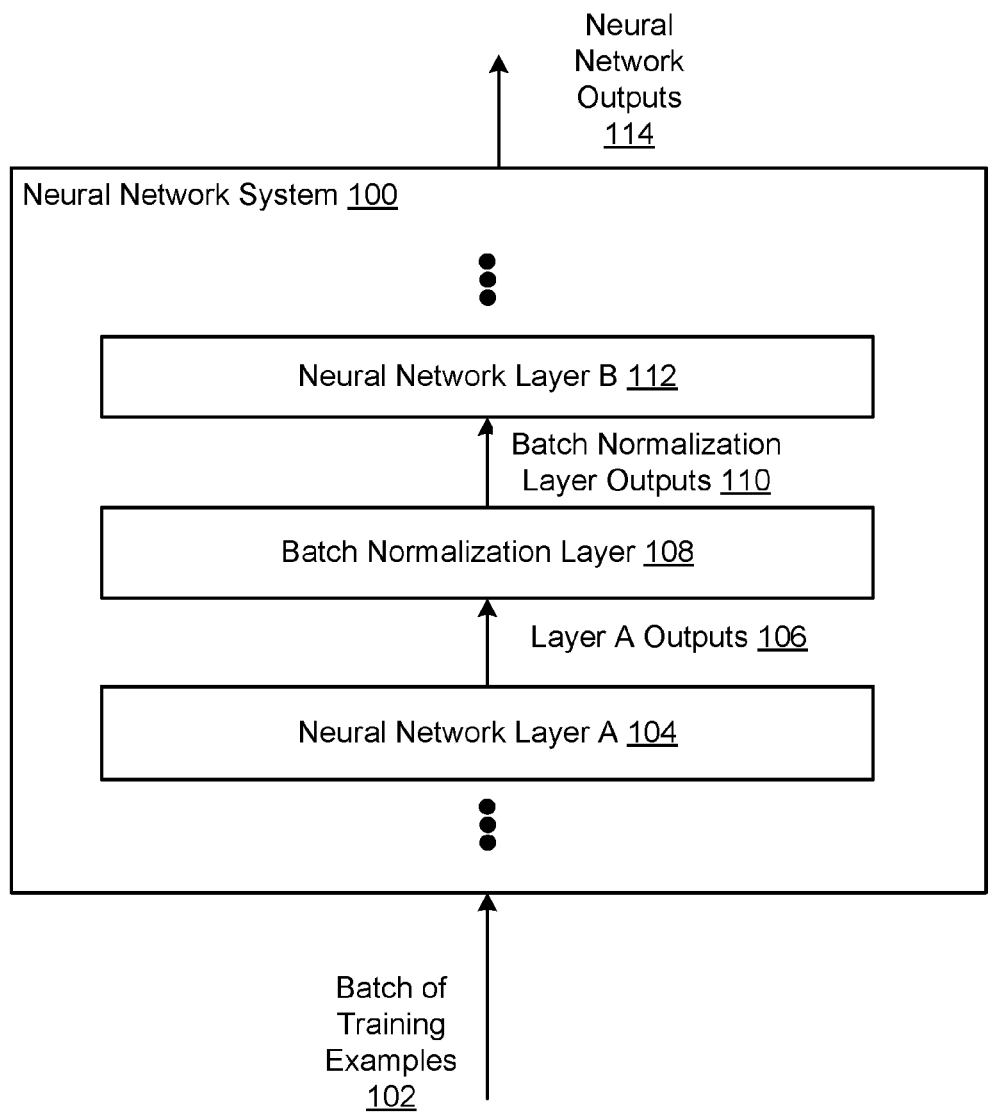
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 includes multiple neural network layers that are arranged in a sequence from a lowest layer in the sequence to a highest layer in the sequence. The neural network system generates neural network outputs from neural network inputs by processing the neural network inputs through each of the layers in the sequence.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of an impression context for a particular advertisement, the output generated by the neural network system 100 may be a score that represents an estimated likelihood that the particular advertisement will be clicked on.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item.

As another example, if the input to the neural network system 100 is text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is a spoken utterance, a sequence of spoken utterances, or features derived from one of the two, the output generated by the neural network system 100 may be a score for each of a set of pieces of text, each score representing an estimated likelihood that the piece of text is the correct transcript for the utterance or sequence of utterances.

As another example, the neural network system 100 can be part of an autocompletion system or part of a text processing system.

As another example, the neural network system 100 can be part of a reinforcement learning system and can generate outputs used for selecting actions to be performed by an agent interacting with an environment.

In particular, each of the layers of the neural network is configured to receive an input and generate an output from the input and the neural network layers collectively process neural network inputs received by the neural network system 100 to generate a respective neural network output for each received neural network input. Some or all of the neural network layers in the sequence generate outputs from inputs in accordance with current values of a set of parameters for the neural network layer. For example, some layers may multiply the received input by a matrix of current parameter values as part of generating an output from the received input.

The neural network system 100 also includes a batch normalization layer 108 between a neural network layer A 104 and a neural network layer B 112 in the sequence of neural network layers. The batch normalization layer 108 is configured to perform one set of operations on inputs received from the neural network layer A 104 during training of the neural network system 100 and another set of operations on inputs received from the neural network layer A 104 after the neural network system 100 has been trained.

In particular, the neural network system 100 can be trained on multiple batches of training examples in order to determine trained values of the parameters of the neural network layers. A batch of training examples is a set of multiple training examples. For example, during training, the neural network system 100 can process a batch of training examples 102 and generate a respective neural network output for each training example in the batch 102. The neural network outputs can then be used to adjust the values of the parameters of the neural network layers in the sequence, e.g., through conventional gradient descent and backpropagation neural network training techniques.

During training of the neural network system 100 on a given batch of training examples, the batch normalization layer 108 is configured to receive layer A outputs 106 generated by the neural network layer A 104 for the training examples in the batch, process the layer A outputs 106 to generate a respective batch normalization layer output 110 for each training example in the batch, and then provide the batch normalization layer outputs 110 as an input to the neural network layer B 112. The layer A outputs 106 include a respective output generated by the neural network layer A 104 for each training example in the batch. Similarly, the batch normalization layer outputs 110 include a respective output generated by the batch normalization layer 108 for each training example in the batch.

Generally, the batch normalization layer 108 computes a set of normalization statistics for the batch from the layer A outputs 106, normalizes the layer A outputs 106 to generate a respective normalized output for each training example in the batch, and, optionally, transforms each of the normalized outputs before providing the outputs as input to the neural network layer B 112.

The normalization statistics computed by the batch normalization layer 108 and the manner in which the batch normalization layer 108 normalizes the layer A outputs 106 during training depend on the nature of the neural network layer A 104 that generates the layer A outputs 106.

In some cases, the neural network layer A 104 is a layer that generates an output that includes multiple components indexed by dimension. For example, the neural network layer A 104 may be a fully-connected neural network layer. In some other cases, however, the neural network layer A 104 is a convolutional layer or other kind of neural network layer that generates an output that includes multiple components that are each indexed by both a feature index and a spatial location index. Generating the batch normalization layer output during training of the neural network system 100 in each of these two cases is described in more detail below with reference to FIG. 2.

Once the neural network system 100 has been trained, the neural network system 100 may receive a new neural network input for processing and process the neural network input through the neural network layers to generate a new neural network output for the input in accordance with the trained values of the parameters of the components of the neural network system 100. The operations performed by the batch normalization layer 108 during the processing of the new neural network input also depend on the nature of the neural network layer A 104. Processing a new neural network input after the neural network system 100 has been trained is described in more detail below with reference to FIG. 3.

The batch normalization layer 108 may be included at various locations in the sequence of neural network layers and, in some implementations, multiple batch normalization layers may be included in the sequence.

In the example of FIG. 1, in some implementations, the neural network layer A 104 generates outputs by modifying inputs to the layer in accordance with current values of a set of parameters for the first neural network layer, e.g., by multiplying the input to the layer by a matrix of the current parameter values. In these implementations, the neural network layer B 112 may receive an output from the batch normalization layer 108 and generate an output by applying a non-linear operation, i.e., a non-linear activation function, to the batch normalization layer output. Thus, in these implementations, the batch normalization layer 108 is inserted within a conventional neural network layer, and the operations of the conventional neural network layer are divided between the neural network layer A 104 and the neural network layer B 112.

In some other implementations, the neural network layer A 104 generates the outputs by modifying layer inputs in accordance with current values of a set of parameters to generate a modified first layer inputs and then applying a non-linear operation to the modified first layer inputs before providing the output to the batch normalization layer 108. Thus, in these implementations, the batch normalization layer 108 is inserted after a conventional neural network layer in the sequence.

Figure 2:
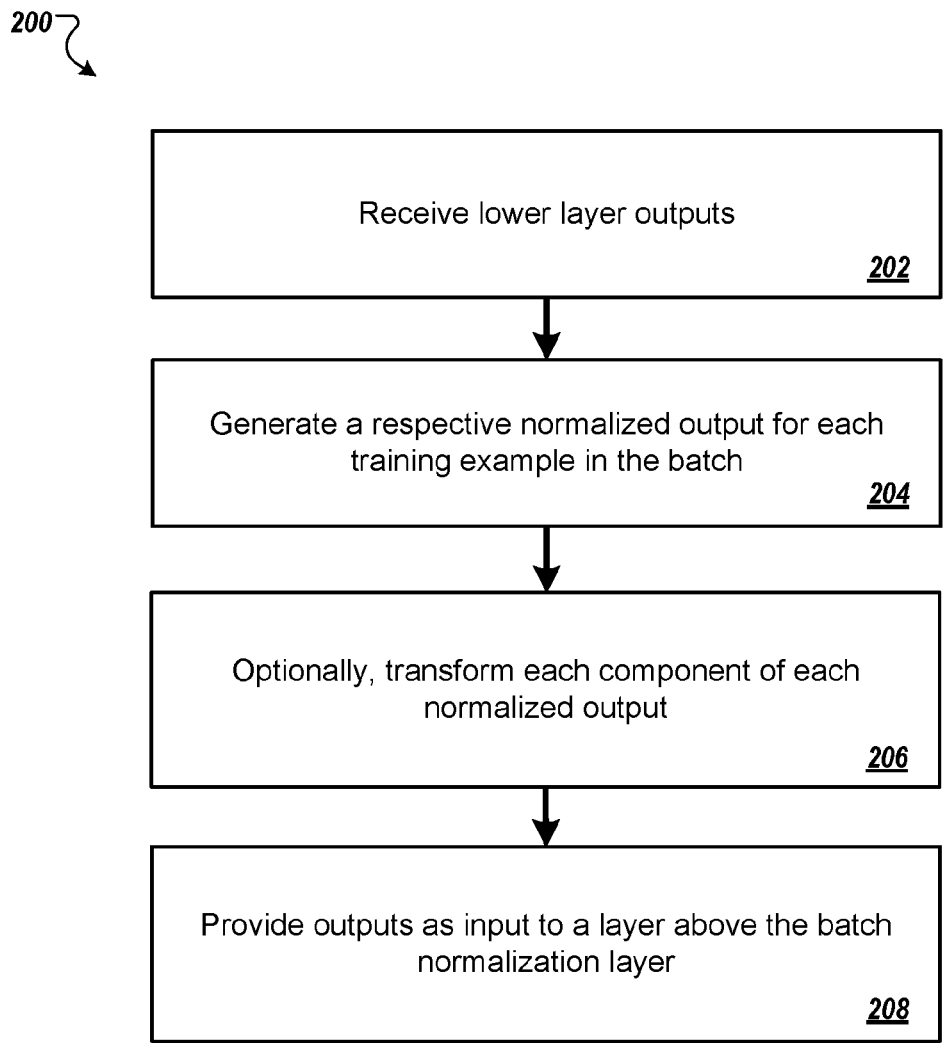
FIG. 2 is a flow diagram of an example process for processing an input using a batch normalization layer during training of the neural network system.

FIG. 2 is a flow diagram of an example process 200 for generating a batch normalization layer output during training of a neural network on a batch of training examples. For convenience, the process 200 will be described as being performed by a system of one or more computers located in one or more locations. For example, a batch normalization layer included in a neural network system, e.g., the batch normalization layer 108 included in the neural network system 100 of FIG. 1, appropriately programmed, can perform the process 200.

The batch normalization layer receives lower layer outputs for the batch of training examples (step 202). The lower layer outputs include a respective output generated for each training example in the batch by the layer below the batch normalization layer in the sequence of neural network layers.

The batch normalization layer generates a respective normalized output for each training example in the batch (step 204). That is, the batch normalization layer generates a respective normalized output from each received lower layer output.

In some cases, the layer below the batch normalization layer is a layer that generates an output that includes multiple components indexed by dimension.

In these cases, the batch normalization layer computes, for each dimension, the mean and the standard deviation of the components of the lower layer outputs that correspond to the dimension. The batch normalization layer then normalizes each component of each of the lower level outputs using the means and standard deviations to generate a respective normalized output for each of the training examples in the batch. In particular, for a given component of a given output, the batch normalization layer normalizes the component using the mean and the standard deviation computed for the dimension corresponding to the component. For example, in some implementations, for a component $x_{k,i}$ corresponding to the k-th dimension of the i-th lower layer output from a batch β, the normalized output $\hat{x}_{k,i}$ satisfies:

$$\hat{x}_{k,i} = \frac{x_{k,i} - \mu_B}{\sigma_B},$$

where $\mu_B$ is the mean of the components corresponding to the k-th dimension of the lower layer outputs in the batch β and $\sigma_B$ is the standard deviation of the components corresponding to the k-th dimension of the lower layer outputs in the batch β. In some implementations, the standard deviation is a numerically stable standard deviation that is equal to $(\sigma_B^2+\varepsilon)^{1/2}$, where ε is a constant value and $\sigma_B^2$ is the variance of the components corresponding to the k-th dimension of the lower layer outputs in the batch β.

In some other cases, however, the neural network layer below the batch normalization layer is a convolutional layer or other kind of neural network layer that generates an output that includes multiple components that are each indexed by both a feature index and a spatial location index.

In some of these cases, the batch normalization layer computes, for each possible feature index and spatial location index combination, the mean and the variance of the components of the lower layer outputs that have that feature index and spatial location index. The batch normalization layer then computes, for each feature index, the average of the means for the feature index and spatial location index combinations that include the feature index. The batch normalization layer also computes, for each feature index, the average of the variances for the feature index and spatial location index combinations that include the feature index. Thus, after computing the averages, the batch normalization layer has computed a mean statistic for each feature across all of the spatial locations and a variance statistic for each feature across all of the spatial locations.

The batch normalization layer then normalizes each component of each of the lower level outputs using the average means and the average variances to generate a respective normalized output for each of the training examples in the batch. In particular, for a given component of a given output, the batch normalization layer normalizes the component using the average mean and the average variance for the feature index corresponding to the component, e.g., in the same manner as described above when the layer below the batch normalization layer generates outputs indexed by dimension.

In others of these cases, the batch normalization layer computes, for each feature index the mean and the variance of the components of the lower layer outputs that correspond to the feature index, i.e., that have the feature index.

The batch normalization layer then normalizes each component of each of the lower level outputs using the means and the variances for the feature indices to generate a respective normalized output for each of the training examples in the batch. In particular, for a given component of a given output, the batch normalization layer normalizes the component using the mean and the variance for the feature index corresponding to the component, e.g., in the same manner as described above when the layer below the batch normalization layer generates outputs indexed by dimension.

Optionally, the batch normalization layer transforms each component of each normalized output (step 206).

In cases where the layer below the batch normalization layer is a layer that generates an output that includes multiple components indexed by dimension, the batch normalization layer transforms, for each dimension, the component of each normalized output in the dimension in accordance with current values of a set of parameters for the dimension. That is, the batch normalization layer maintains a respective set of parameters for each dimension and uses those parameters to apply a transformation to the components of the normalized outputs in the dimension. The values of the sets of parameters are adjusted as part of the training of the neural network system. For example, in some implementations, the transformed normalized output $y_{k,i}$ generated from the normalized output $\hat{x}_{k,i}$ satisfies:

$$y_{k,i} = \gamma_k \hat{x}_{k,i} + A_k,$$

where $\gamma_k$ and $A_k$ are the parameters for the k-th dimension.

In cases where the layer below the batch normalization layer is a convolutional layer, the batch normalization layer transforms, for each component of each of the normalized outputs, the component in accordance with current values of a set of parameters for the feature index corresponding to the component. That is, the batch normalization layer maintains a respective set of parameters for each feature index and uses those parameters to apply a transformation to the components of the normalized outputs that have the feature index, e.g., in the same manner as described above when the layer below the batch normalization layer generates outputs indexed by dimension. The values of the sets of parameters are adjusted as part of the training of the neural network system.

The batch normalization layer provides the normalized outputs or the transformed normalized outputs as input to a layer above the batch normalization layer in the sequence (step 208).

After the neural network has generated the neural network outputs for the training examples in the batch, the normalization statistics are backpropagated through as part of adjusting the values of the parameters of the neural network, i.e., as part of performing the backpropagation training technique.

Figure 3:
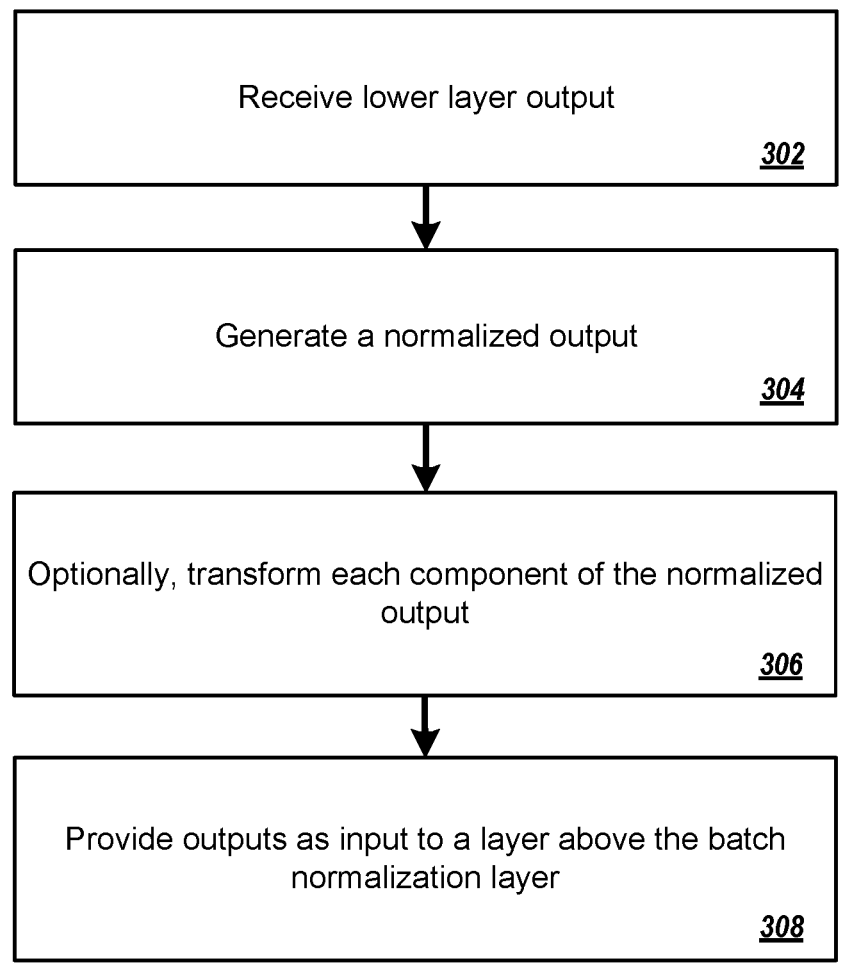
FIG. 3 is a flow diagram of an example process for processing an input using a batch normalization after the neural network system has been trained.

FIG. 3 is a flow diagram of an example process 300 for generating a batch normalization layer output for a new neural network input after the neural network has been trained. For convenience, the process 300 will be described as being performed by a system of one or more computers located in one or more locations. For example, a batch normalization layer included in a neural network system, e.g., the batch normalization layer 108 included in the neural network system 100 of FIG. 1, appropriately programmed, can perform the process 300.

The batch normalization layer receives a lower layer output for the new neural network input (step 302). The lower layer output is an output generated for the new neural network input by the layer below the batch normalization layer in the sequence of neural network layers.

The batch normalization layer generates a normalized output for the new neural network input (step 304).

If the outputs generated by the layer below the batch normalization layer are indexed by dimension, the batch normalization layer normalizes each component of the lower layer output using pre-computed means and standard deviations for each of the dimensions to generate a normalized output. In some cases, the means and standard deviations for a given dimension are computed from the components in the dimension of all of outputs generated by the layer below the batch normalization layer during the training of the neural network system.

In some other cases, however, the means and standard deviations for a given dimension are computed from the components in the dimension of the lower layer outputs generated by the layer below the batch normalization layer after training, e.g., from lower layer outputs generated during in a most recent time window of specified duration or from a specified number of lower layer outputs most recently generated by the layer below the batch normalization layer.

In particular, in some cases the distribution of network inputs and, accordingly, the distribution of lower layer outputs may change between the training examples used during training and the new neural network inputs used after the neural network system is trained, e.g., if the new neural network inputs are different kinds of inputs from the training examples. For example, the neural network system may have been trained on user images and may now be used to process video frames. The user images and the video frames likely have different distributions in terms of the classes pictured, image properties, composition, and so on. Therefore, normalizing the lower layer inputs using statistics from the training may not accurately capture the statistics of the lower layer outputs being generated for the new inputs. Thus, in these cases, the batch normalization layer can use normalization statistics computed from lower layer outputs generated by the layer below the batch normalization layer after training.

If the outputs generated by the layer below the batch normalization layer are indexed by feature index and spatial location index, the batch normalization layer normalizes each component of the lower layer output using pre-computed average means and average variances for each of the feature indices, to generate a normalized output. In some cases, as described above, the average means and average variances for a given feature index, are computed from the outputs generated by the layer below the batch normalization layer for all of the training examples used during training. In some other cases, as described above, the means and standard deviations for a given feature index are computed from the lower layer outputs generated by the layer below the batch normalization layer after training.

Optionally, the batch normalization layer transforms each component of the normalized output (step 306).

If the outputs generated by the layer below the batch normalization layer are indexed by dimension, the batch normalization layer transforms, for each dimension, the component of the normalized output in the dimension in accordance with trained values of the set of parameters for the dimension. If the outputs generated by the layer below the batch normalization layer are indexed by feature index and spatial location index, the batch normalization layer transforms each component of the normalized output in accordance with trained values of the set of parameters for the feature index corresponding to the component.

The batch normalization layer provides the normalized output or the transformed normalized output as input to the layer above the batch normalization layer in the sequence (step 308).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers, the neural network system comprising:
instructions for implementing a batch normalization layer between a first neural network layer and a second neural network layer in a neural network, wherein the first neural network layer generates first layer outputs having a plurality of components, and wherein the instructions cause the one or more computers to perform operations comprising:
during training of the neural network on a plurality of batches of training data, each batch comprising a respective plurality of training examples and for each of the batches:
receiving a respective first layer output for each of the plurality of training examples in the batch;
computing a plurality of normalization statistics for the batch from the first layer outputs, comprising:
determining, for each of a plurality of subsets of the plurality of the components of the first layer outputs, a mean of the components of the first layer outputs for each of the plurality of training examples in the batch that are in the respective subset, and
determining, for each of the plurality of subsets of the plurality of the components of the first layer outputs, a standard deviation of the components of the first layer outputs for each of the plurality of training examples in the batch that are in the respective subset;
normalizing each of the plurality of the components of each first layer output using the normalization statistics to generate a respective normalized layer output for each training example in the batch, comprising:
for each first layer output and for each of the plurality of subsets, normalizing the components of the first layer output that are in the respective subset using the mean for the respective subset and the standard deviation for the respective subset;
generating a respective batch normalization layer output for each of the training examples from the normalized layer outputs; and
providing the batch normalization layer output as an input to the second neural network layer.

2. The neural network system of claim 1, wherein the plurality of the components of the first layer output are indexed by dimension, and wherein computing a plurality of normalization statistics for the first layer outputs comprises:
computing, for each of the dimensions, a mean of the components of the first layer outputs in the dimension; and
computing, for each of the dimensions, a standard deviation of the components of the first layer outputs in the dimension.

3. The neural network system of claim 2, wherein normalizing each of the plurality of the components of each first layer output comprises:
normalizing the component using the computed mean and computed standard deviation for the dimension corresponding to the component.

4. The neural network system of claim 2, wherein generating the respective batch normalization layer output for each of the training examples from the normalized layer outputs comprises:
transforming, for each dimension, the component of the normalized layer output for the training example in the dimension in accordance with current values of a set of parameters for the dimension.

5. The neural network system of claim 4, wherein the operations further comprise, after the neural network system has been trained to determine trained values of the parameters for each of the dimensions:
receiving a new first layer output generated by the first neural network layer for a new neural network input;
normalizing each component of the new first layer output using pre-computed mean and standard deviation statistics for the dimensions to generate a new normalized layer output;
generating a new batch normalization layer output by transforming, for each dimension, the component of the new normalized layer output for the training example in the dimension in accordance with trained values of the set of parameters for the dimension; and
providing the batch normalization layer output as a new layer input to the second neural network layer.

6. The neural network system of claim 5, wherein the pre-computed mean and standard deviation statistics for the dimensions are computed from first layer outputs generated by the first neural network layer during the training of the neural network.

7. The neural network system of claim 5, wherein the pre-computed mean and standard deviation statistics for the dimensions are computed from new first layer outputs generated by the first neural network layer after the neural network has been trained.

8. The neural network system of claim 7, wherein new neural network inputs processed by the neural network system after the neural network has been trained are a different type of input than the training examples used to train the neural network.

9. The neural network system of claim 1, wherein the first neural network layer is a convolutional layer, wherein the plurality of the components of the first layer output are indexed by feature index and spatial location index, and wherein computing a plurality of normalization statistics for the first layer outputs comprises:
computing, for each combination of feature index and spatial location index, a mean of the components of the first layer outputs having the feature index and spatial location index;
computing, for each feature index, an average of the means for combinations that include the feature index;
computing, for each combination of feature index and spatial location index, a variance of the components of the first layer outputs having the feature index and spatial location index; and
computing, for each feature index, an average of the variances for combinations that include the feature index.

10. The neural network system of claim 9, wherein normalizing each of the plurality of the components of each layer output comprises:
normalizing the component using the average of the means and the average of the variances for the feature index corresponding to the component.

11. The neural network system of claim 9, wherein generating the respective batch normalization layer output for each of the training examples from the normalized layer outputs comprises:

transforming each of the plurality of the components of the normalized layer output in accordance with current values of a set of parameters for the feature index corresponding to the component.

12. The neural network system of claim 11, wherein the operations further comprise, after the neural network has been trained to determine trained values of the parameters for each of the dimensions:

receive a new first layer input generated from a new neural network input;

normalize each of the plurality of the components of the new first layer output using pre-computed mean and standard deviation statistics for the feature indices to generate a new normalized layer output;

generate a new batch normalization layer output by transforming each of the plurality of the components of the normalized layer output in accordance with trained values of the set of parameters for the feature index corresponding to the component; and provide the new batch normalization layer output as a new layer input to the second neural network layer.

13. The neural network system of claim 1, wherein the first neural network layer is a convolutional layer, wherein the plurality of the components of the first layer output are indexed by feature index and spatial location index, and wherein computing a plurality of normalization statistics for the first layer outputs comprises, for each of the feature indices:

computing a mean of the components of the first layer outputs that correspond to the feature index; and computing a variance of the components of the first layer outputs that correspond to the feature index.

14. The neural network system of claim 13, wherein normalizing each of the plurality of the components of each layer output comprises:

normalizing the component using the mean and the variance for the feature index corresponding to the component.

15. The neural network system of claim 13, wherein generating the respective batch normalization layer output for each of the training examples from the normalized layer outputs comprises:

transforming each of the plurality of the components of the normalized layer output in accordance with current values of a set of parameters for the feature index corresponding to the component.

16. The neural network system of claim 15, wherein the operations further comprise, after the neural network has been trained to determine trained values of the parameters for each of the dimensions:

receive a new first layer input generated from a new neural network input;

normalize each component of the new first layer output using pre-computed mean and standard deviation statistics for the feature indices to generate a new normalized layer output;

generate a new batch normalization layer output by transforming each of the plurality of the components of the normalized layer output in accordance with trained values of the set of parameters for the feature index corresponding to the component; and provide the new batch normalization layer output as a new layer input to the second neural network layer.

17. The neural network system of claim 1, wherein the first neural network layer generates the first layer outputs by modifying first layer inputs in accordance with current values of a set of parameters for the first neural network layer.

18. The neural network system of claim 17, wherein the second neural network layer generates second layer outputs by applying a non-linear operation to the batch normalization layer outputs.

19. The neural network system of claim 1, wherein the first neural network layer generates the first layer outputs by modifying first layer inputs in accordance with current values of a set of parameters to generate modified first layer inputs and then applying a non-linear operation to the modified first layer inputs.

20. The neural network system of claim 1, wherein, during the training of the neural network, the neural network system is configured to backpropagate the normalization statistics as part of adjusting values of parameters of the neural network.

21. A method performed by one or more computers implementing a batch normalization layer that is between a first neural network layer and a second neural network layer in a neural network, wherein the first neural network layer generates first layer outputs having a plurality of components, and wherein the method comprises;

during training of the neural network on a plurality of batches of training data, each batch comprising a respective plurality of training examples and for each of the batches:

receiving a respective first layer output for each of the plurality of training examples in the batch;

computing a plurality of normalization statistics for the batch from the first layer outputs, comprising:

determining, for each of a plurality of subsets of the plurality of the components of the first layer outputs, a mean of the components of the first layer outputs for each of the plurality of training examples in the batch that are in the respective subset, and determining, for each of the plurality of subsets of the plurality of the components of the first layer outputs, a standard deviation of the components of the first layer outputs for each of the plurality of training examples in the batch that are in the respective subset;

normalizing each of the plurality of the components of each first layer output using the normalization statistics to generate a respective normalized layer output for each training example in the batch, comprising:

for each first layer output and for each of the plurality of subsets, normalizing the components of the first layer output that are in the respective subset using the mean for the respective subset and the standard deviation for the respective subset;

generating a respective batch normalization layer output for each of the training examples from the normalized layer outputs; and providing the batch normalization layer output as an input to the second neural network layer.

22. One or more non-transitory computer-readable storage media encoded with a computer program, the computer program comprising instructions that when executed by one or more computers cause the one or more computers to implement a neural network system, the neural network system comprising:

batch normalization instructions for implementing a batch normalization layer between a first neural network layer and a second neural network layer in a neural network, wherein the first neural network layer generates first layer outputs having a plurality of components, and wherein the batch normalization instructions cause the one or more computers to perform operations comprising:

during training of the neural network on a plurality of batches of training data, each batch comprising a respective plurality of training examples and for each of the batches:

receiving a respective first layer output for each of the plurality of training examples in the batch;

computing a plurality of normalization statistics for the batch from the first layer outputs, comprising:

determining, for each of a plurality of subsets of the plurality of the components of the first layer outputs, a mean of the components of the first layer outputs for each of the plurality of training examples in the batch that are in the respective subset, and determining, for each of the plurality of subsets of the plurality of the components of the first layer outputs, a standard deviation of the components of the first layer outputs for each of the plurality of training examples in the batch that are in the respective subset;

normalizing each of the plurality of the components of each first layer output using the normalization statistics to generate a respective normalized layer output for each training example in the batch, comprising:

for each first layer output and for each of the plurality of subsets, normalizing the components of the first layer output that are in the respective subset using the mean for the respective subset and the standard deviation for the respective subset;

generating a respective batch normalization layer output for each of the training examples from the normalized layer outputs; and providing the batch normalization layer output as an input to the second neural network layer.

23. The non-transitory computer-readable storage media of claim 22, wherein the plurality of the components of the first layer output are indexed by dimension, and wherein computing a plurality of normalization statistics for the first layer outputs comprises:

computing, for each of the dimensions, a mean of the components of the first layer outputs in the dimension; and computing, for each of the dimensions, a standard deviation of the components of the first layer outputs in the dimension.

24. The non-transitory computer-readable storage media of claim 23, wherein normalizing each of the plurality of the components of each first layer output comprises:

normalizing the component using the computed mean and computed standard deviation for the dimension corresponding to the component.

25. The non-transitory computer-readable storage media of claim 23, wherein generating the respective batch normalization layer output for each of the training examples from the normalized layer outputs comprises:

transforming, for each dimension, the component of the normalized layer output for the training example in the dimension in accordance with current values of a set of parameters for the dimension.

26. The non-transitory computer-readable storage media of claim 22, wherein the first neural network layer is a convolutional layer, wherein the plurality of the components of the first layer output are indexed by feature index and spatial location index, and wherein computing a plurality of normalization statistics for the first layer outputs comprises, for each of the feature indices:

computing a mean of the components of the first layer outputs that correspond to the feature index; and computing a variance of the components of the first layer outputs that correspond to the feature index.

27. The non-transitory computer-readable storage media of claim 26, wherein normalizing each of the plurality of the components of each layer output comprises:

normalizing the component using the mean and the variance for the feature index corresponding to the component.

28. The non-transitory computer-readable storage media of claim 26, wherein generating the respective batch normalization layer output for each of the training examples from the normalized layer outputs comprises:

transforming each of the plurality of the components of the normalized layer output in accordance with current values of a set of parameters for the feature index corresponding to the component.

29. The method of claim 21, wherein the plurality of the components of the first layer output are indexed by dimension, and wherein computing a plurality of normalization statistics for the first layer outputs comprises:

computing, for each of the dimensions, a mean of the components of the first layer outputs in the dimension; and computing, for each of the dimensions, a standard deviation of the components of the first layer outputs in the dimension.

30. The method of claim 29, wherein normalizing each of the plurality of the components of each first layer output comprises:

normalizing the component using the computed mean and computed standard deviation for the dimension corresponding to the component.

31. The method of claim 29, wherein generating the respective batch normalization layer output for each of the training examples from the normalized layer outputs comprises:

transforming, for each dimension, the component of the normalized layer output for the training example in the dimension in accordance with current values of a set of parameters for the dimension.

32. The method of claim 21, wherein the first neural network layer is a convolutional layer, wherein the plurality of the components of the first layer output are indexed by feature index and spatial location index, and wherein computing a plurality of normalization statistics for the first layer outputs comprises, for each of the feature indices:

computing a mean of the components of the first layer outputs that correspond to the feature index; and computing a variance of the components of the first layer outputs that correspond to the feature index.

33. The method of claim 32, wherein normalizing each of the plurality of the components of each layer output comprises:
   normalizing the component using the mean and the variance for the feature index corresponding to the component.

34. The method of claim 32, wherein generating the respective batch normalization layer output for each of the training examples from the normalized layer outputs comprises:
   transforming each of the plurality of the components of the normalized layer output in accordance with current values of a set of parameters for the feature index corresponding to the component.

\* \* \* \* \*